March 31, 1942. E. C. COFFMAN 2,277,956
METALLIC DOWEL PIN
Filed Dec. 6, 1940 4 Sheets-Sheet 4
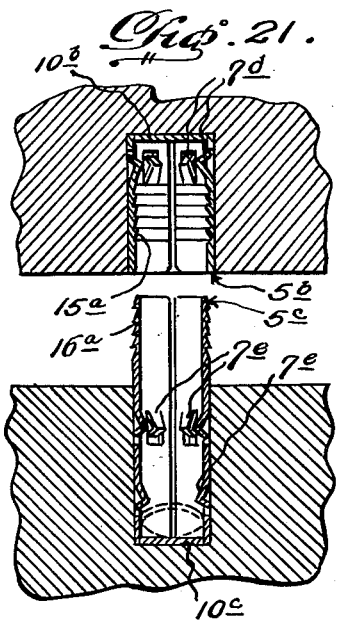
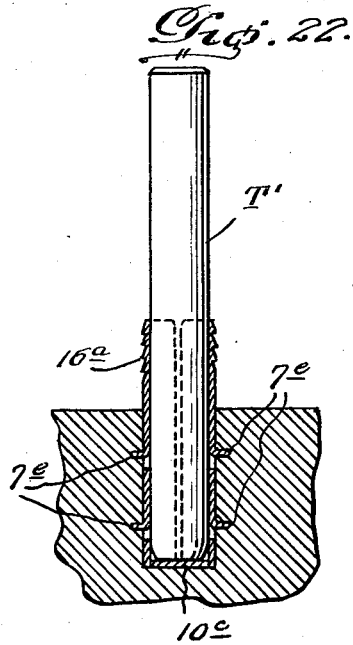
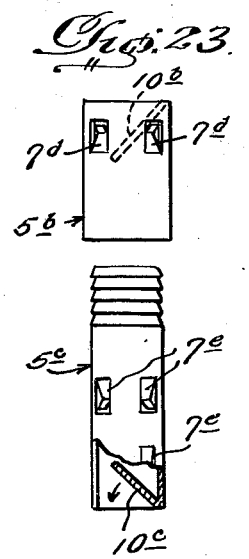
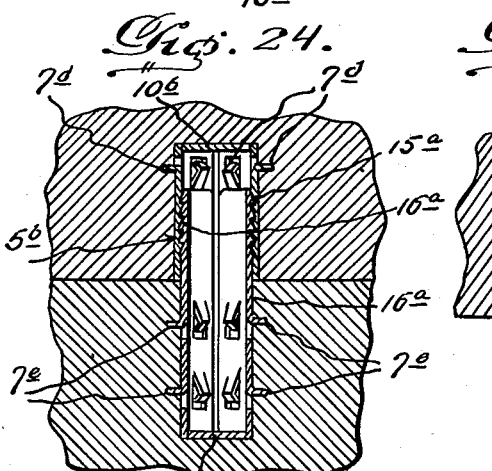
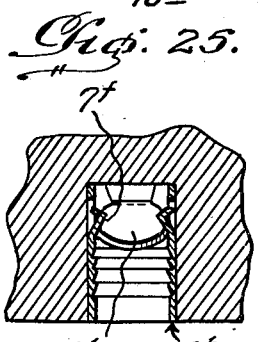
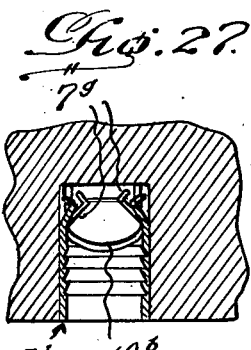
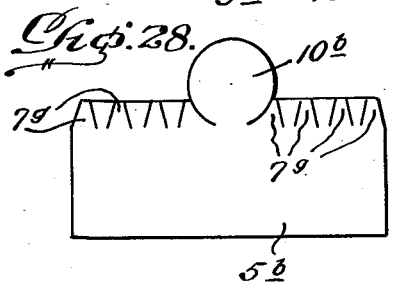
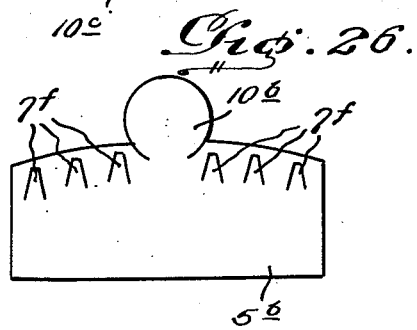
Inventor
Elmore C. Coffman,
By Stanley Burch
Attorney Patented Mar. 31, 1942

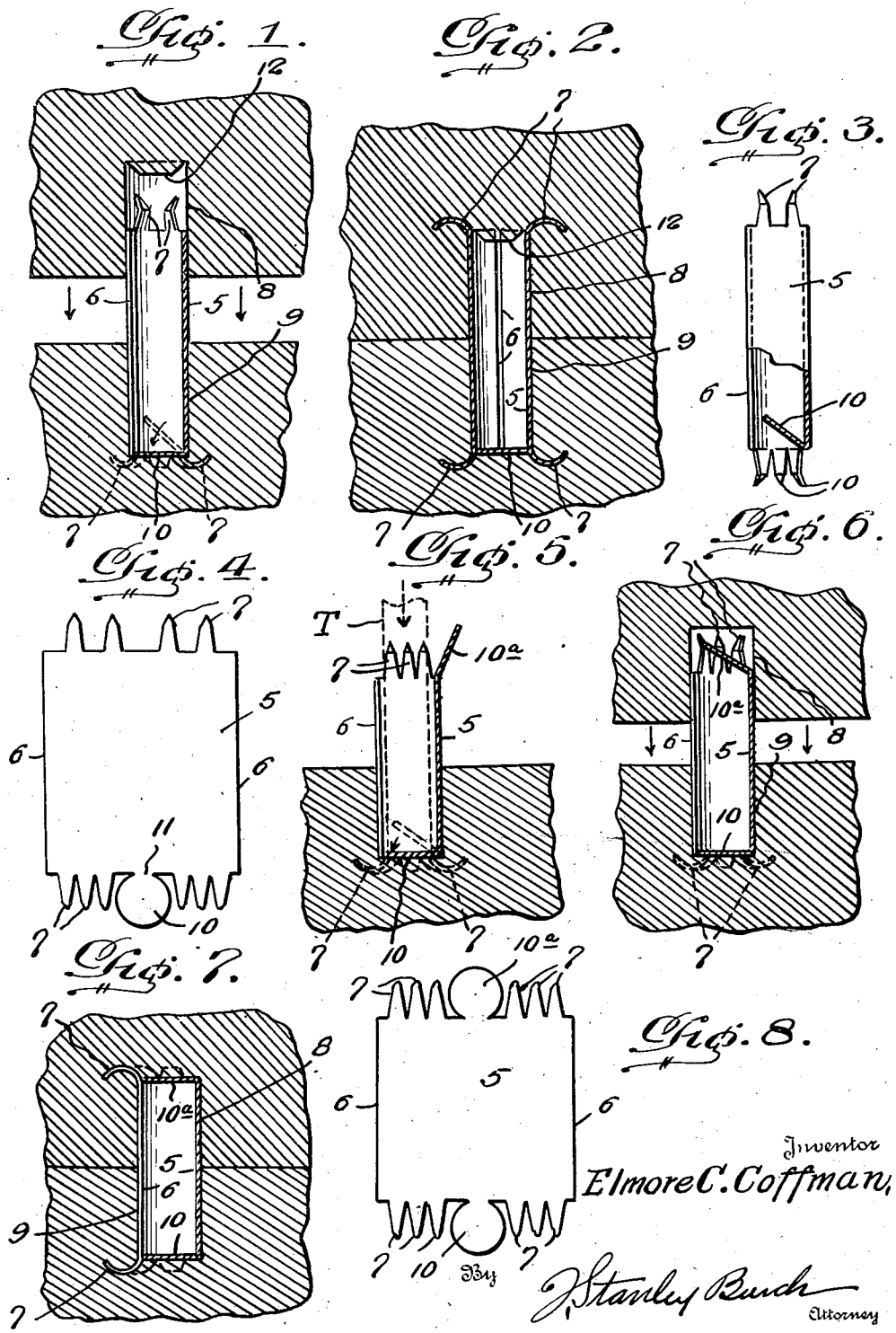

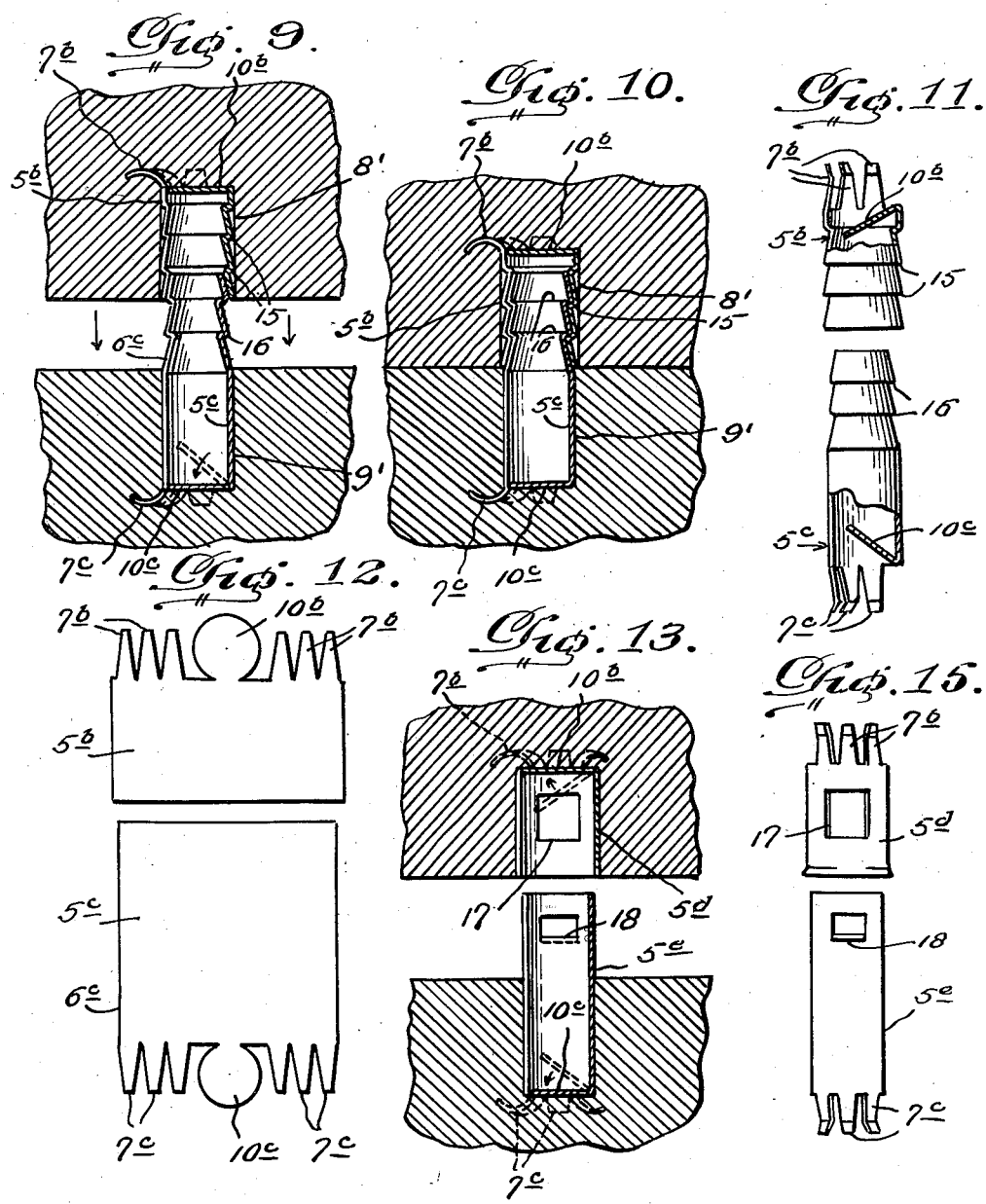

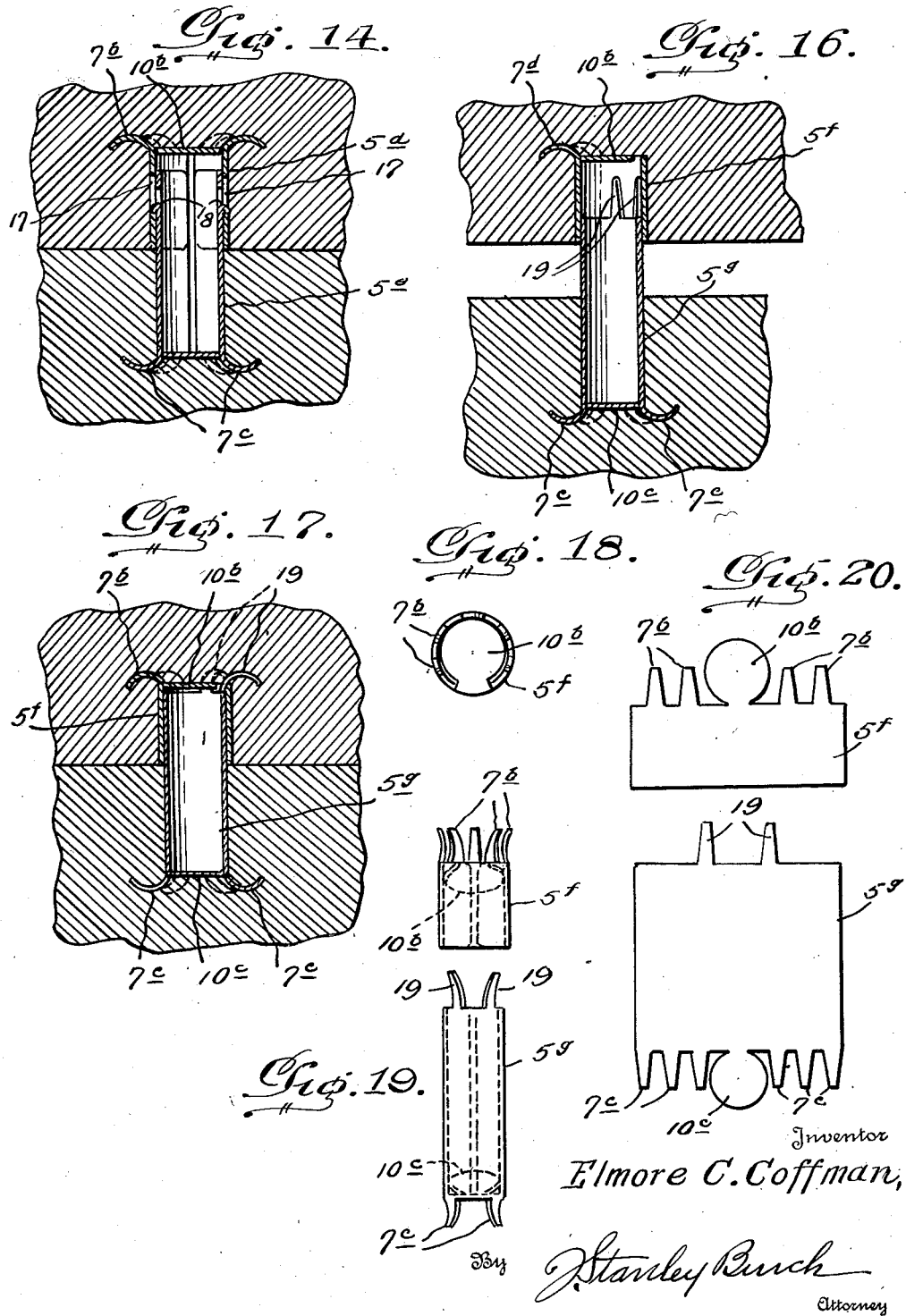

2,277,956

UNITED STATES PATENT OFFICE 2,277,956

METALLIC DOWEL PIN

Elmore Cooper Coffman, Evansville, Ind.

Application December 6, 1940, Serial No. 368,923

7 Claims. (Cl. 85—14)

This invention relates to improvements in dowel pins, and has more particular reference to an improved metallic dowel pin having prongs adapted to be driven into the wooden members to be joined so as to anchor the pin in said members.

The primary object of the present invention is to provide a dowel pin of the above kind including a transversely expansible body portion, and means for expanding said body portion so that it will fit tightly in the bores of the members to be joined by the dowel pin. In this way, the bores may be purposely made of a diameter slightly larger than the original diameter of the dowel body portion to facilitate initial insertion of the dowel in said bores, after which the body of the dowel may be expanded to tightly fit such bores.

Another object of the present invention is to provide a dowel pin of the above kind composed of telescopic sections adapted to be respectively inserted and secured in the bores of the respective members to be joined, whereby the members may be shipped in separated condition and joined at the point of use or destination, simple and efficient means being provided for locking the sections of the dowel together when telescoped one within the other, so that the members will be effectively joined in proper relation.

With the above general objects in view, and others that will become apparent after the nature of the present invention is better understood, such invention consists in the novel form, combination and arrangement of parts hereinafter more fully described, shown in the accompanying drawings and claimed.

In the drawings:

Figure 1 is a sectional view illustrating one form of dowel pin constructed in accordance with the present invention, one end of the dowel pin being anchored in one of the members to be joined, and the other end of the dowel pin being shown preparatory to anchoring the same.

Figure 2 is a view of the construction shown in Figure 1 after the two members have been completely joined.

Figure 3 is a view of the dowel pin of Figures 1 and 2 in its original condition, the dowel pin being partly in elevation and partly in longitudinal section.

Figure 4 is a plan view of the blank from which the dowel pin of Figures 1 to 3 inclusive is formed.

Figure 5 is a view somewhat similar to Figure 1 showing a modified form of dowel pin constructed in accordance with the present invention having one end thereof anchored in one of the members to be joined.

Figure 6 is a view of the dowel pin shown in Figure 5 and illustrating the condition of the other end of the dowel pin preparatory to joining the two members.

Figure 7 is a view similar to Figure 2 of the construction shown in Figures 5 and 6.

Figure 8 is a plan view of the blank from which the dowel pin of Figures 5 to 7 inclusive is formed.

Figure 9 is a view showing a still further form of dowel pin constructed in accordance with the present invention and composed of sections which are anchored in the respective members to be joined preparatory to telescoping the sections of the dowel pin.

Figure 10 is a view similar to Figure 9 showing the sections of the dowel pin entirely telescoped and the members completely joined.

Figure 11 is a view partly in elevation and partly in section of the dowel pin shown in Figures 9 and 10, the sections of the dowel pin being separated to more clearly illustrate the construction thereof.

Figure 12 is a developed view showing in plan the blanks from which the sections of the dowel pin shown in Figures 9 to 11 inclusive are formed.

Figure 13 is a view similar to Figure 9 of a still further modification, but with the sections of the dowel pin entirely disengaged.

Figure 14 is a view similar to Figure 10 of the construction shown in Figure 13.

Figure 15 is a view similar to Figure 11, of the dowel pin shown in Figure 13.

Figure 16 is a view similar to Figure 9 illustrating still another modification of dowel pin constructed in accordance with the present invention.

Figure 17 is a view similar to Figure 10 of the construction shown in Figure 16.

Figure 18 is a plan view of the dowel pin of Figure 17, looking toward the end of said dowel pin which is uppermost in Figure 17.

Figure 19 is a view similar to Figure 14 of the dowel pin shown in Figures 16 to 18 inclusive.

Figure 20 is a view similar to Figure 12 of the blanks from which the sections of the dowel pin shown in Figure 19 are formed.

Figure 21 is a view similar to Figure 13 of another form of the invention.

Figure 22 is a view similar to Figure 5, showing how the prongs of the dowel pin of Figure 21 are projected by a tool.

Figure 23 is a view similar to Figure 19 of the pin shown in Figure 21.

Figure 24 is a view similar to Figure 17 of the construction shown in Figure 21.

Figure 25 illustrates a modification of the upper dowel section shown in Figure 21, with the prongs arranged to be projected by the body expanding disk.

Figure 26 is a plan view of the blank from which the dowel section of Figure 25 is formed.

Figure 27 is a view similar to Figure 25 showing a modification of the pin section disclosed in the latter figure, and Figure 28 is a view similar to Figure 26 of the pin section shown in Figure 27.

Referring in details to the drawings, the present dowel pin may take the form illustrated in Figures 1 to 4 inclusive, wherein the dowel pin is made from a single piece of sheet metal and includes a body portion 5 bent to cylindrical form and having the longitudinal edges 6 thereof free or unconnected, whereby said body portion is transversely expansible. A plurality of spaced pointed prongs 7 are formed integral with the body portion 5 and project therefrom at both ends thereof. These prongs are preferably curved inwardly from their points of juncture with the body of the pin to their piercing points or outer ends, and such outer ends are normally disposed within the circumference of the body of the pin so that the ends of the latter may be readily inserted in the bores 8 and 9 of the members to be joined. The bores 8 and 9 may be purposely made of a diameter slightly larger than the original diameter of the dowel so that the latter may be readily inserted in such bores, and means is provided for subsequently expanding the body of the dowel so that it will fit snugly in the bores prior to final driving of the prongs 7 into the members to be joined. In the embodiment of Figures 1 to 4 inclusive, this body expander consists of a disk 10 having a restricted integral connection with an end of the body 5 as at 11 and normally occupying an inwardly extending oblique position with respect to the body of the dowel as indicated by dotted lines in Figure 1 and by full lines in Figure 3. The disk 10 is of a diameter slightly larger than the normal internal diameter of the dowel body 5 so that when said disk 10 is bent to the full line position of Figure 1 at right angles to the longitudinal axis of the dowel, it will cause the body of the dowel to expand into snug engagement with the walls of the bores 8 and 9 prior to driving the prongs into the members to be joined by forcing said members toward each other. While the prongs will turn outwardly and clinch when driven into the members to be joined, means may be provided to facilitate this at the end where no body expander is provided. This means may consist of a frusto-conical expander for the prongs formed at the bottom of the bore 8 as at 12 when said bore is formed. This can obviously be accomplished by a special boring tool leaving a core constituting the expander 12, as will be apparent. Thus, when the body of the dowel has been expanded to tightly fit the bores 8 and 9 and the members have been forced together to cause the prongs to clinch therein as shown in Figure 2, a secure and efficient joint for the members is effected.

In the construction shown in Figures 5 to 8 inclusive, an additional body expanding disk 10a is provided on the end opposite that provided with the body expander 10. In using this dowel of Figures 5 to 8 inclusive, the end of the dowel provided with the body expander 10 is inserted in one of the members to be joined and the body of the dowel is expanded by forcing the expander 10 to the full line position of Figure 5 by means of a tool inserted through the dowel body as indicated by dotted lines at T. The expander 10a will be bent outwardly so that it is entirely out of the way of the tool when this is taking place, after which the expander 10a will be bent inwardly at an oblique position within the adjacent prongs of the dowel. Thus, when the other piece of work is engaged with the other end of the dowel, and the pieces of work or members to be joined are forced together the remaining prongs will be forced into such other piece of work and when the expander 10a strikes the bottom of the bore 8 of this other piece of work, it will be forced inwardly to a position at right angles to and within the adjacent end of the body 5 of the dowel so as to cause tight fitting of this end of the body in the bore 8. Otherwise, the construction of Figures 5 to 8 inclusive is identical with that of Figures 1 to 4 inclusive, and similar parts in both forms are accordingly indicated by like reference numerals.

In the embodiment of Figures 9 to 12 inclusive, the dowel 10 is composed of two telescopic sections, one adopted to be inserted in the bore of each member to be joined, and each being formed from a single sheet of metal to include a body portion 5b and 5c respectively. The body portion of each dowel section has its longitudinal edges 6c free or unconnected so that said body portion may be expanded to snugly fit the bore of the associated piece of work even though such bore is made of slightly greater diameter than the normal diameter of the dowel pin section. At the outer end of each dowel pin section, a body expanding disk 10b and 10c is formed, and these ends of the dowel pin sections are also provided with the projecting integral prongs 7b and 7c. The body portions 5b and 5c of the dowel pin sections are formed with annular corrugations of ratchet form in cross section so that the abrupt shoulders thereof face inwardly as at 15 and 16. Thus, when the section 5c is forced into the slightly larger section 5b, said sections will be positively and permanently interlocked for correspondingly joining the members having the bores 8' and 9' in which said dowel pin sections are secured. Each dowel section is placed in its corresponding bore 8' or 9', whereupon the body of said section is expanded to fit the bore tightly by bending its body expander 10b or 10c to a position at right angles to the body portion as above described with respect to the expander 10 in the form of Figure 1.

The members to be joined are then forced together so as to cause the prongs 7b and 7c to enter the clinch within the joined members, whereupon an efficient joint of such members is produced as illustrated in Figure 10.

The embodiment of the invention shown in Figures 13 to 15 inclusive is similar to that shown in Figures 9 to 12 inclusive except as to the means for joining the dowel pin sections when one is telescoped into the other. In this embodiment, the section 5d has an opening 17 formed in the body thereof and the section 5e has an outwardly directed lug 18 struck therefrom adapted to snap into the opening 17 at the inner end of the latter when the sections are fully telescoped. Otherwise, this embodiment is identical with the embodiment of Figure 9, and corresponding parts in both forms are indicated by like reference numerals.

In the embodiment of Figures 16 to 20 inclusive, the sections 5f and 5g are joined when fully telescoped, by means of prongs 19 formed on the inner end of the section 5g and passing the point of connection of the body expanding disk 10b with the body of the section 5f, as well as being driven into and clinched within the piece of work within which said dowel section 5f is secured. Otherwise, the device of Figures 16 to 20 inclusive corresponds to that of Figures 9 to 12 inclusive, and like parts in both forms are indicated by like reference characters. The purpose of making the dowels of Figures 9, 13 and 16 in sections is to permit the sections to be secured in the bores of the respective pieces of work and then permit the pieces of work to be shipped in compact separated condition to the point of use. After arrival at the point of use, the pieces of work can be readily joined by simply telescoping the dowel sections and forcing the pieces of work together. I have found that a dowel construced in accordance with this invention will securely lock the members together so that they cannot be pulled apart readily. Also, the dowels are maintained so as to fit tightly in the bores of the pieces of work or joined members.

In the form of Figures 21 to 24 inclusive, the dowel pin sections are grooved to provide the annular ratchet teeth 15a and 16a which coact to interlock the sections. Also, the prongs 7d and 7e are struck from the bodies of the sections and bent into angular form, as well as normally disposed at an inward inclination so that they may be projected by simply forcing a tool T' into said sections as shown in Figure 22. Otherwise, this form is similar to that of Figure 11.

As shown in Figures 25 and 27, the prongs may be arranged in the path of the body expanding disk 10b so that they will be expanded by the latter when it is forced to body expanding position by means of a tool. The only difference between the forms of Figure 25 and Figure 27 is that the prongs 7f of Figure 25 are struck from the body of the pin section, while the prongs 7g of Figure 27 are struck from the end thereof. Remaining parts in all of these forms are similar and indicated by like reference characters.

From the foregoing description, it is believed that the construction and manner of use, as well as the advantages of the present invention will be readily understood and appreciated by those skilled in the art. It will be seen that the invention is susceptible to many minor changes in details of construction, as well as capable of extensive modification, without departing from the spirit and scope of the invention as claimed.

What I claim as new is:

1. A dowel pin having a body portion made from a single piece of sheet metal bent to cylindrical form and having the longitudinal edges thereof free whereby said body portion is transversely expansible, an expander for said body portion consisting of a disk having a restricted integral connection with an end of the body portion and normally occupying an oblique position with respect to said body portion, said disk being of a diameter slightly larger than the normal internal diameter of the body portion so that when said disk is bent at right angles to the longitudinal axis of the body portion it will cause said body portion to expand, and a plurality of spaced pointed prongs integral with an end of said body portion.

2. As a new article of manufacture, a dowel pin made from a single piece of sheet metal and including a body portion bent to cylindrical form and having the longitudinal edges of the body free whereby said body portion is transversely expansible, a plurality of spaced pointed prongs integral with said body portion and projecting therefrom at both ends thereof, and expanders for said body portion comprising disks having restricted integral connections with the ends of the body portion and a diameter slightly larger than the normal internal diameter of said body portion, one of said disks normally occupying an inwardly extending oblique position with respect to the body portion, the other disk being flexible outwardly to permit the insertion of a tool for forcing the first-named disk at right angles to the longitudinal axis of the dowel and thereby expand the associated end of the dowel body, the second-named disk being flexible to an outwardly extending oblique position for being forced inwardly at right angles to the longitudinal axis of the dowel and expanding the end of the dowel body when the latter end is driven into the bore of a member.

3. A dowel composed of two telescopic sections, each section being made from a single piece of sheet metal and including a body portion bent to cylindrical form and having the longitudinal edges of the body free whereby said body portion is transversely expansible, a plurality of spaced pointed prongs integral with the outer end of the body portion of each dowel section, an expander for the body portion of each dowel section including a disk having a restricted integral connection with the outer end of the body portion of said section and normally occupying an inwardly extending oblique position with respect to said body portion, said disk being of slightly larger diameter than the normal internal diameter of the associated dowel body so that when said disk is forced to a position at right angles to the dowel body the latter will be expanded, and means affording an automatic interlocking connection between the dowel sections when they are fully telescoped one within the other.

4. A dowel composed of two telescopic sections, each section being made from a single piece of sheet metal and including a body portion bent to cylindrical form and having the longitudinal edges of the body free whereby said body portion is transversely expansible, a plurality of spaced pointed prongs integral with the outer end of the body portion of each dowel section, an expander for the body portion of each dowel section including a disk having a restricted integral connection with the outer end of the body portion of said section and normally occupying an inwardly extending oblique position with respect to said body portion, said disk being of slightly larger diameter than the normal internal diameter of the associated dowel body so that when said disk is forced to a position at right angles to the dowel body the latter will be expanded, and means affording an automatic inter-locking connection between the dowel sections when they are fully telescoped one within the other, said last-named means comprising annular ratchet like corrugations formed on the inner ends of the dowel sections so that the abrupt shoulders thereof face inwardly.

5. A dowel pin having a body portion made from a single piece of sheet metal bent to cylindrical form and having the longitudinal edges thereof free whereby said body portion is transversely expansible, an expander for said body portion consisting of a disk having a restricted integral connection with an end of the body portion and normally occupying an oblique position with respect to said body portion so that when said disk is bent at right angles to the longitudinal axis of the body portion it will cause said body portion to expand, and a plurality of spaced pointed prongs integral with said body portion.

6. A dowel pin having a body portion made from a single piece of sheet metal bent to cylindrical form and having the longitudinal edges thereof free whereby said body portion is transversely expansible, an expander for said body portion consisting of a disk having a restricted integral connection with an end of the body portion and normally occupying an oblique position with respect to said body portion so that when said disk is bent at right angles to the longitudinal axis of the body portion it will cause said body portion to expand, and a plurality of spaced pointed prongs integral with said body portion, said prongs being of angular form and disposed at an inward inclination so that they may be projected by means of a tool driven into said body portion.

7. A dowel pin having a body portion made from a single piece of sheet metal bent to cylindrical form and having the longitudinal edges thereof free whereby said body portion is transversely expansible, an expander for said body portion consisting of a disk having a restricted integral connection with an end of the body portion and normally occupying an oblique position with respect to said body portion so that when said disk is bent at right angles to the longitudinal axis of the body portion it will cause said body portion to expand, and a plurality of spaced pointed prongs integral with said body portion, said prongs being of angular form and disposed at an inward inclination in the path of said disk for being projected by the latter when said disk is forced to body expanding position.

ELMORE COOPER COFFMAN.